US009967804B2

(12) United States Patent
Liu et al.

(10) Patent No.: US 9,967,804 B2
(45) Date of Patent: May 8, 2018

(54) BASE STATION AND METHOD FOR REDUCING ABNORMAL CELL RE-SELECTION BEHAVIORS

(71) Applicant: Industrial Technology Research Institute, Chutung, Hsinchu County (TW)

(72) Inventors: Chia-Lung Liu, Chutung (TW); Mu-Liang Wang, Chutung (TW); Guan-Hsien Du, Chutung (TW)

(73) Assignee: Industrial Technology Research Institute, Chutung, Hsinchu County (TW)

( * ) Notice: Subject to any disclaimer, the term of this patent is extended or adjusted under 35 U.S.C. 154(b) by 631 days.

(21) Appl. No.: 14/534,359

(22) Filed: Nov. 6, 2014

(65) Prior Publication Data
US 2015/0341831 A1    Nov. 26, 2015

(30) Foreign Application Priority Data

May 22, 2014    (TW) .............................. 103117871 A

(51) Int. Cl.
*H04W 36/30* (2009.01)
*H04W 48/12* (2009.01)
*H04W 48/20* (2009.01)

(52) U.S. Cl.
CPC ............ *H04W 48/12* (2013.01); *H04W 48/20* (2013.01)

(58) Field of Classification Search
CPC .............................. H04W 48/12; H04W 48/20
See application file for complete search history.

(56) References Cited

U.S. PATENT DOCUMENTS

| 8,675,560 B2 | 3/2014 | Yoo et al. |
| 2010/0056217 A1* | 3/2010 | Montojo ............... H04W 28/18 455/562.1 |

(Continued)

FOREIGN PATENT DOCUMENTS

| EP | 2709406 A2 | 3/2014 |
| TW | 201234899 A | 8/2012 |

OTHER PUBLICATIONS

Office Action dated Nov. 10, 2015 in TW 10421514920.

(Continued)

*Primary Examiner* — Lester Kincaid
*Assistant Examiner* — William Wang
(74) *Attorney, Agent, or Firm* — McCarter & English, LLP; Yu Lu

(57) ABSTRACT

A base station and a method that reduce abnormal cell re-selection behaviors. The base station includes: a detection module having a pattern information detector that provides pattern information of an almost blank subframe, and a measurement configuration adjustor that provides a first parameter threshold for cell-selection and generates a second parameter threshold for cell-selection according to the pattern information; and a measurement configuration generating module having a measurement configuration schedule generator that generates a broadcasting schedule according to the pattern information, a system information broadcaster that transmits first schedule information to first user equipment when the first user equipment establishes connection to allow the first user equipment to receive the first parameter threshold according to the first schedule information and perform cell-selection, and a dedicated signal generator that generates a dedicated signal and transmits second schedule information to second user equipment when the second user equipment establishes connection.

14 Claims, 5 Drawing Sheets

(56) References Cited

U.S. PATENT DOCUMENTS

| | | | |
|---|---|---|---|
| 2012/0113843 A1 | 5/2012 | Watfa et al. | |
| 2012/0115469 A1 | 5/2012 | Chen et al. | |
| 2012/0115485 A1 | 5/2012 | Narasimha et al. | |
| 2012/0149362 A1* | 6/2012 | Tooher | H04W 24/10 455/423 |
| 2012/0157082 A1 | 6/2012 | Pedersen et al. | |
| 2013/0044600 A1 | 2/2013 | Sridhar et al. | |
| 2013/0077507 A1 | 3/2013 | Yu et al. | |
| 2013/0155999 A1 | 6/2013 | Seo et al. | |
| 2013/0215787 A1* | 8/2013 | Jeong | H04W 36/30 370/252 |
| 2015/0099528 A1* | 4/2015 | Hu | H04W 72/042 455/452.1 |
| 2015/0215820 A1* | 7/2015 | Ye | H04W 28/08 370/235 |

OTHER PUBLICATIONS

Barbieri et al., "Coordinated Downlink Multi-Point Communications in Heterogeneous Cellular Networks," Information Theory and Applications Workshop (ITA),10 pages (2012).

Barbieri et al., "LTE Femtocells: System Design and Performance Analysis," *IEEE Journal on Selected Areas in Communications*, 5 pages (2012).

Bhat et al., "LTE-Advanced: An Operator Perspective," *IEEE Communications Magazine*, pp. 104-114 (2012).

Damnjanovic et al., "UE's role in LTE advanced heterogeneous networks," *IEEE Communications Magazine*, pp. 164-176 (2012).

Deb et al., "Algorithms for Enhanced Inter-Cell Interference Coordination (eICIC) in LTE HetNets," *IEEE/ACM Transactions on Networking*, 22(1):137-150 (2013).

El Shaer, "Interference Management in LTE-Advanced Heterogeneous Networks Using Almost Blank Subframes," Degree Project in Signal Processing, Stockholm, Sweden, pp. 1-74 (2012).

Fan et al., "Joint User Pairing and Resource Allocation for LTE Uplink Transmission," *IEEE Transactions on Wireless Communications*, 11(8):2838-2847 (2012).

Güvenç et al., "Range Expansion and Inter-Cell Interference Coordination (ICIC) for Picocell Networks," Vehicular Technology Conference (VTC Fall), *IEEE*, 6 pages, (2011).

Kamel and Elsayed, "Performance Evaluation of a Coordinated Time-Domain eICIC Framework based on ABSF in Heterogeneous LTE-Advanced Networks," Globecom 2012—Wireless Networking Symposium, *IEEE*, pp. 5326-5331 (2012).

Kshatriya et al., "On Interference Management based on Subframe Blanking in Heterogeneous LTE Networks," 2013 Fifth International Conference on Communication Systems and Networks (COMSNETS), pp. 1-7 (2013).

Lopez-Perez et al., "Mobility Enhancements of Heterogeneous Networks through Interference Coordination," WCNC 2012 Workshop on Broadband Femtocell Technologies, *IEEE*, pp. 69-74 (2012).

Uygungelen et al., "Protection of Cell-Edge Users in Wireless Systems by Using Almost Blank Subframes," Proceedings of 2013 9th International ITG Conference on Systems, Communication and Coding (SCC), pp. 1-6 (2013).

Yang and Zhang, "Approaches to enhancing autonomous power control at Femto under co-channel deployment of Macrocell and Femtocell," 22nd International Symposium on Personal Indoor and Mobile Radio Communications (PIMRC), *IEEE*, 5 pages (2011).

TW 201234899 English abstract.

\* cited by examiner

BASE STATION AND METHOD FOR REDUCING ABNORMAL CELL RE-SELECTION BEHAVIORS

CROSS-REFERENCE TO RELATED APPLICATION

This application claims foreign priority under 35 U.S.C. § 119(a) to Patent Application No. 103117871, filed on May 22, 2014, in the Intellectual Property Office of Ministry of Economic Affairs, Republic of China (Taiwan, R.O.C.), the entire content of which Patent Application is incorporated herein by reference.

TECHNICAL FIELD

This disclosure relates to base stations of wireless communication, and, more particularly, to a base station and a method that reduce abnormal cell re-selection behaviors.

BACKGROUND OF THE INVENTION

As the number of users in a wireless network increases and the network application services become more versatile, how to ensure that user equipment (UE) that uses these network application services can have better mobile network quality and transmission rate is becoming one of the concerned topics for a long term evolution technique (LTE) and an advanced long term evolution technique (LTE-A).

The 3rd Generation Partnership Project (3GPP) proposed a wireless network architecture, i.e., the Heterogeneous Network (HetNet), that employs a high-power macro base station (Macro eNB), a low-power pico base station (Pico eNB) and a femto base station (Femto eNB) and can increase the network capacity.

The advanced long term evolution technique further proposed an Enhanced Intercell Interference Coordination (eICIC) that solves the co-channel interference problem between the high-power base station and the low-power base station in the HetNet.

However, in an anti-interference mechanism provided in the eICIC, an almost blank subframe generates abnormal cell-selection behaviors to user equipment that is disposed in a region of a signal range of the base station intersecting with a signal range of the neighboring base station and has a long term evolution technique (LTE).

In other words, the user equipment that has the LET measures the Reference Signal Received Quality (RSRQ) of the base station and the neighboring base station, performs cell-selection according to the RSRQ and a parameter threshold for cell-selection, and decides whether it should handover to the neighboring base station or stay in the original base station according to a result of the cell-selection.

However, since the RSRQ is a ratio of the reference signal received power (RSRP) and the received signal strength indication (RSSI), and an almost blank subframe (ABS) does not need to transmit the data of the base station such that the number of interfering sources becomes smaller, the RSSI measured by user equipment that has the LTE is reduced. As a result, the RSRQ is too optimistic, and the user equipment that has the LTE generates abnormal cell-selection behaviors. Therefore, erroneous handover decisions are made between the service base station and the neighboring base station.

Therefore, how to overcome the above drawbacks is becoming an urgent issue in the art.

SUMMARY OF THE INVENTION

The present disclosure discloses a base station for reducing abnormal cell re-selection behaviors, comprising: a detection module having a pattern information detector that provides pattern information of an almost blank subframe, and a measurement configuration adjustor that provides a first parameter threshold for cell-selection and generates a second parameter threshold for cell-selection according to the pattern information of the almost blank subframe; and a measurement configuration generating module connected to the detection module and having a measurement configuration schedule generator that generates a broadcasting schedule according to the pattern information of the almost blank subframe, a system information broadcaster that transmits a first schedule information to first user equipment according to the broadcasting schedule when the first user equipment establishes connection to allow the first user equipment to receive the first parameter threshold from the system information broadcaster according to the first schedule information and perform cell-selection according to the first parameter threshold, and a dedicated signal generator that generates a dedicated signal and transmits second schedule information to second user equipment when the second user equipment establishes connection to allow the second user equipment to receive the second parameter threshold from the system information broadcaster according to the second schedule information and perform cell-selection according to the second parameter threshold.

The present disclosure further discloses a method for reducing abnormal cell re-selection behaviors, comprising: a base station providing pattern information of an almost blank subframe; the base station providing a first parameter threshold for cell-selection, and generating a second parameter threshold for cell-selection according to the pattern information of the almost blank subframe; the base station generating a broadcasting schedule; and the base station transmitting the first schedule information to first user equipment according to the broadcasting schedule when the first user equipment establishes connection to allow the first user equipment to receive the first parameter threshold from the base station according to the first schedule information and perform cell-selection according to the first parameter threshold, and the base station generating a dedicated signal and transmitting a second schedule information to second user equipment when the second user equipment establishes connection to allow the second user equipment to receive the second parameter threshold from the base station according to the second schedule information and perform cell-selection according to the second parameter threshold.

It is thus known from the above that the base station and the method for reducing abnormal cell re-selection behaviors according to the present disclosure.

It is thus known from the above that the base station and the method for reducing abnormal cell re-selection behaviors according to the present disclosure use the almost blank subframe (ABS) technique in the base station or its neighboring base station to control the first user equipment (e.g., LTE) and the second user equipment (e.g., LTE-A) to perform cell-selection according to the first parameter threshold and the second parameter threshold, respectively. Therefore, the first user equipment neither feels too optimistic for the RSRQ nor generates a great amount of abnormal cell-selection behaviors. Erroneous reselection decisions of the first user equipment made between the base station and the neighboring base station can be avoided accordingly.

BRIEF DESCRIPTION OF THE DRAWINGS

The disclosure can be more fully understood by reading the following detailed description of the exemplary embodiments, with reference made to the accompanying drawings.

FIGS. 3A to 3F illustrate the method for reducing abnormal cell re-selection behaviors according to the present disclosure, wherein FIG. 3B illustrates the pattern information of the almost blank subframe, and FIG. 3D illustrates the transmission of the system information block according to the pattern information of the almost blank subframe.

DETAILED DESCRIPTION OF THE INVENTION

Figure 1:
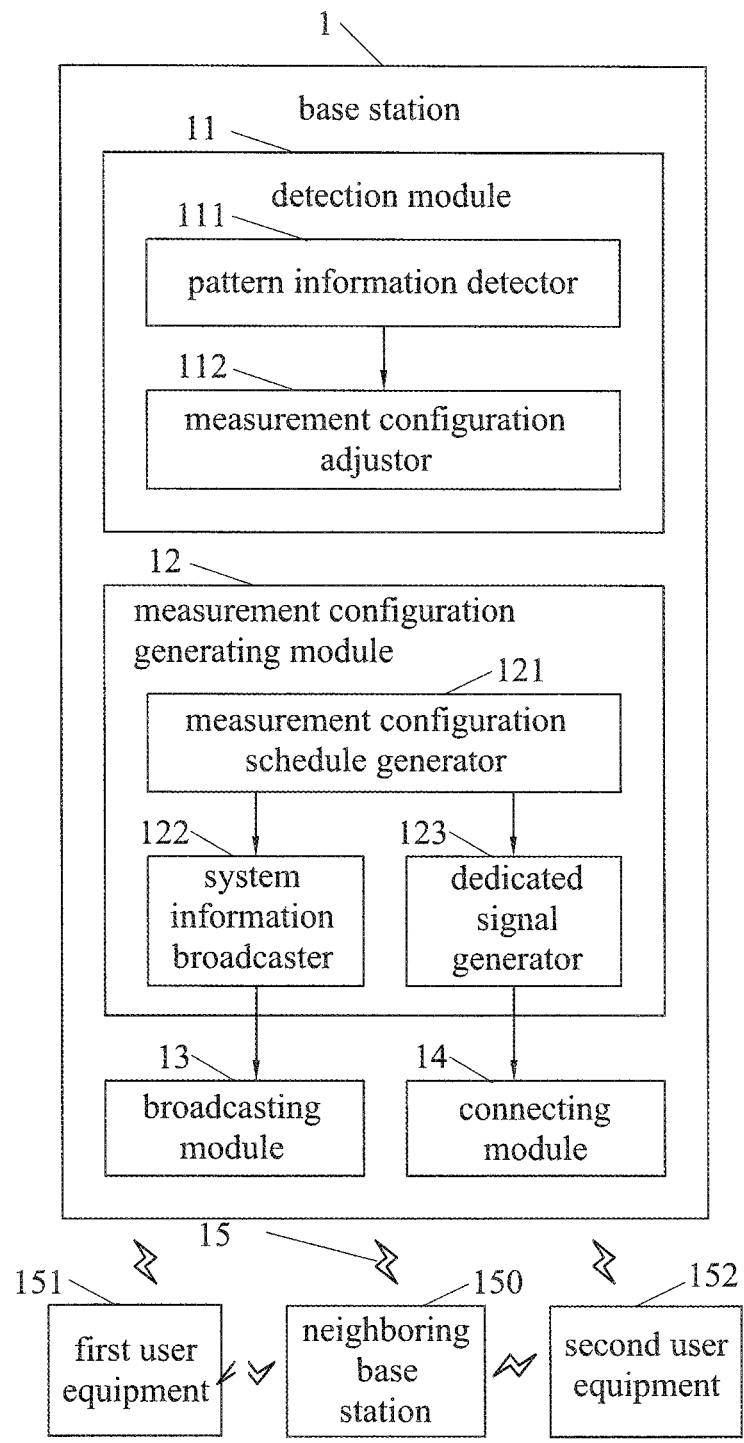
FIG. 1 is a functional block diagram of a base station for reducing abnormal cell re-selection behaviors of an embodiment according to the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a functional block diagram of a base station 1 for reducing abnormal cell re-selection behaviors of an embodiment according to the present disclosure. The base station 1 (e.g., a service base station) comprises a detection module 11 and a measurement configuration generating module 12, and is in communication with a neighboring base station 150, first user equipment 151 or second user equipment 152 via a wireless network 15.

In an embodiment, the base station 1 or the neighboring base station 150 is a high-power micro base station, a low-power pico base station, or a femto base station, and has pattern information of an almost blank subframe (ABS). In an embodiment, the first user equipment 151 is a first communication device that has an almost blank subframe technique (e.g., a long term evolution technique (LTE)), or does not a processing function of the almost blank subframe, and the second user equipment 152 is a second communication device that has an advanced long term evolution technique (LTE-A), or has a processing function of the almost blank subframe.

The detection module 11 comprises a pattern information detector 111 and a measurement configuration adjustor 112. The pattern information detector 111 provides the pattern information of the almost blank subframe of the base station 1 or the neighboring base station 150. For instance, the pattern information detector 111 of the base station 1 (e.g., a service base station) can obtain the pattern information of the almost blank subframe of the neighboring base station 150 through a transmission interface 111 (e.g., X2AP interface) in FIG. 3A. The measurement configuration adjustor 112 provides a first parameter threshold for cell-selection, and generates a second parameter threshold for cell-selection according to the pattern information of the almost blank subframe. The first parameter threshold is greater than, equal to, or less than the second parameter threshold, and can be calculated according to the emission power, annoyance values, and the pattern information of the almost blank subframe of the base station 1 or the neighboring base station 150.

The measurement configuration generating module 12 is connected to the detection module 11, and has a measurement configuration schedule generator 121, a system information broadcaster 122 and a dedicated signal generator 123. The measurement configuration schedule generator 121 generates a broadcasting schedule according to the pattern information of the almost blank subframe.

When establishing connection with the base station 1, the first user equipment 151 can receive system information from information broadcaster 122 (e.g., SIB1) having first schedule information to the first user equipment 151 according to the broadcasting schedule to allow the first user equipment 151 to receive the system information block (e.g., SIB2-SIBn, where n is a positive integer) having the first parameter threshold from the system information broadcaster 122 according to the first schedule information and perform cell-selection according to the first parameter threshold and/or reference signal received quality (RSRQ) when being in an idle mode. Therefore, the first user equipment 151 reduces abnormal cell re-selection behaviors.

When the second user equipment 152 establishes connection, the dedicated signal generator 123 generates a dedicated signal according to a communication protocol, and transmits a system information block (e.g., SIB1) having the second schedule information to the second user equipment 152 through the dedicated signal, and the system information broadcaster 122 transmits a system information block (e.g., SIB2-SIBn) having the second parameter threshold according to the broadcasting schedule to allow the second user equipment 152 to receive the system information block (e.g., SIB2-SIBn) having the second parameter threshold from the system information broadcaster 122 according to the second schedule information of the dedicated signal generator 123 and perform cell-selection according to the second parameter threshold and/or the RSRQ when being in the idle mode.

The first user equipment 151, when being in the idle mode or the connection mode, receives the system information block (e.g., SIB1) having the first schedule information and the system information block (e.g., SIB2-SIBn) having the first parameter threshold. The second user equipment 152, when being in the idle mode or the connection mode, receives the system information block (e.g., SIB1) having the second schedule information and the system information block (e.g., SIB2-SIBn) having the second parameter threshold.

The measurement configuration schedule generator 121 can also determine a version of the first user equipment 151 to determine whether the first user equipment 151 is the first communication device, and determine a version of the second user equipment 152 to determine whether the second user equipment 152 is the second communication device.

The base station 1 comprises a broadcasting module 13 that uses a communication protocol (e.g., wireless resource control protocol) and is connected to the system information broadcaster 122 to receive a system information block (e.g., SIB1) having the first schedule information, a system information block (e.g., SIB2-SIBn) having the first parameter threshold, and a system information block (e.g., SIB2-SIBn) having the second parameter threshold, to transmit the system information block (e.g., SIB1) having the first schedule information and the system information block (e.g., SIB2-SIBn) having the first parameter threshold to the first user equipment 151 in a broadcasting manner, and to transmit the system information block (e.g., SIB2-SIBn) having the second parameter threshold to the second user equipment 152 in a broadcasting manner.

The base station 1 comprises a connecting module 14 that uses the communication protocol and is connected to the dedicated signal generator 123 for receiving the dedicated signal and transmitting the system information block (e.g., SIB1) having the second schedule information to the second user equipment 152 through the dedicated signal.

Figure 2:
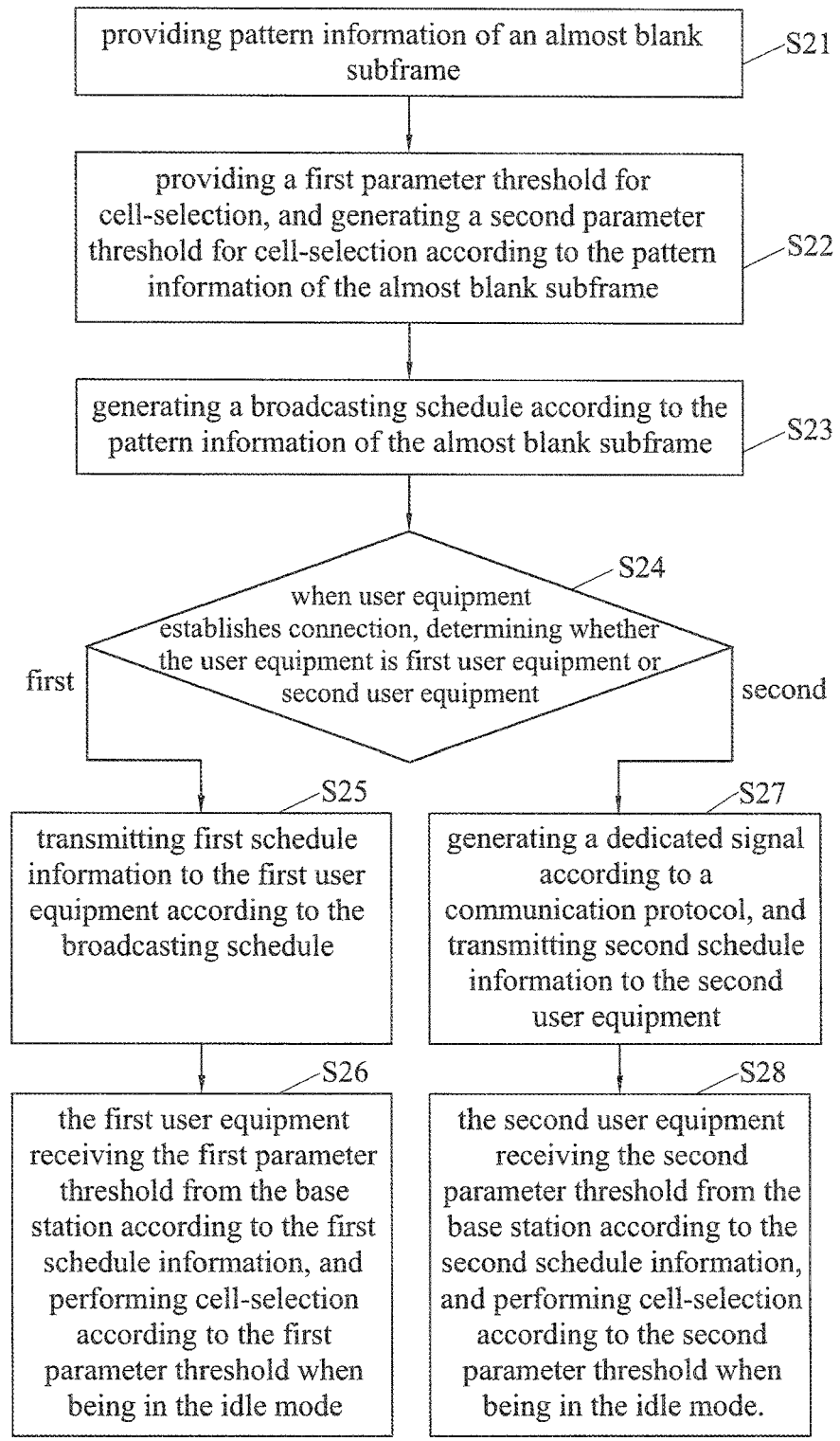
FIG. 2 is a flow chart of a method for reducing abnormal cell re-selection behaviors of an embodiment according to the present disclosure.

FIG. 2 is a flow chart of a method for reducing abnormal cell re-selection behaviors of an embodiment according to the present disclosure. The method comprises steps S21 to S28.

In step S21, the pattern information detector 111 of the base station 1 provides the pattern information of the almost blank subframe to the base station 1 or the neighboring base station 150. The method proceeds to step S22.

In step S22, the measurement configuration adjustor 112 of the base station 1 provides a first parameter threshold for cell-selection, and generates a second parameter threshold for cell-selection according to the pattern information of the almost blank subframe. The second parameter threshold is greater than, equal to, or less than the first parameter threshold. The method proceeds to step S23.

In step S23, the measurement configuration schedule generator 121 of the base station 1 generates a broadcasting schedule according to the pattern information of the almost blank subframe. The method proceeds to step S24.

In step S24, when user equipment establishes connection, the measurement configuration schedule generator 121 determines a version of the user equipment to determine whether the user equipment is the first user equipment 151 or the second user equipment 152. The first user equipment 151 may have an almost blank subframe technique (e.g., a long term evolution technique (LTE)) or may not have a processing function of the almost blank subframe. The second user equipment 152 may have an advanced long term evolution technique (LTE-A) or a processing function of the almost blank subframe. If the user equipment is determined to be the first user equipment 151, the method proceeds to step S25. If the user equipment is determined to be the second user equipment 152, the method proceeds to step S27.

In step S25, when the first user equipment 151 establishes connection, the system information broadcaster 122 and broadcasting module 13 of the base station 1 transmit the system information block (e.g., SIB1) having first schedule information to the first user equipment 151 according to the broadcasting schedule and the communication protocol in a broadcasting manner. The first user equipment 151, when being in the idle mode or the connection mode, receives the system information block (e.g., SIB1) having the first schedule information, or receives the system information block (e.g., SIB2-SIBn) having the first parameter threshold. The method proceeds to step S26.

In step S26, the first user equipment 151 receives the system information block (e.g., SIB2-SIBn) having the first parameter threshold according to the first schedule information, and performs cell-selection according to the first parameter threshold and/or the RSRQ when being in the idle mode.

In step S27, when the second user equipment 152 establishes connection, the dedicated signal generator 123 of the measurement configuration generating module 12 generates a dedicated signal according to a communication protocol (e.g., wireless resource control protocol), and transmits the system information block (e.g., SIB1) having the second schedule information to the second user equipment 152 through the dedicated signal. The second user equipment 152, when being in the idle mode or the connection mode, receives the system information block (e.g., SIB1) having the second schedule information through the dedicated signal, and receives the system information block (e.g., SIB2-SIBn) having the second parameter threshold in a broadcasting manner. The method proceeds to step S28.

In step S28, the second user equipment 152 receives the system information block (e.g., SIB2-SIBn) having the second parameter threshold according to the second schedule information, and performs cell-selection according to the second parameter threshold when being in the idle mode.

Figure 3A:
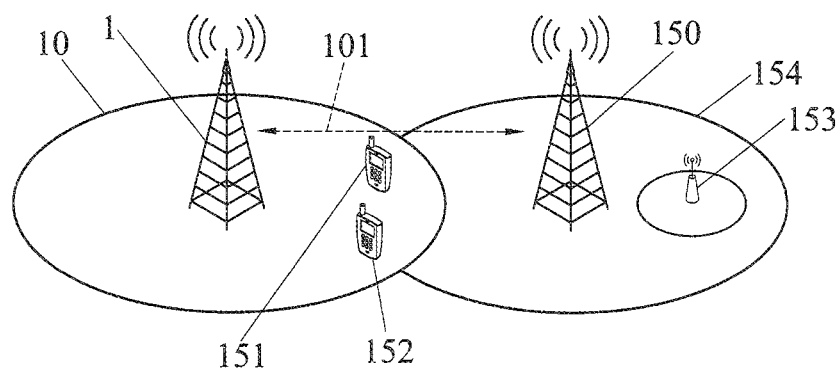
Figure 3B:
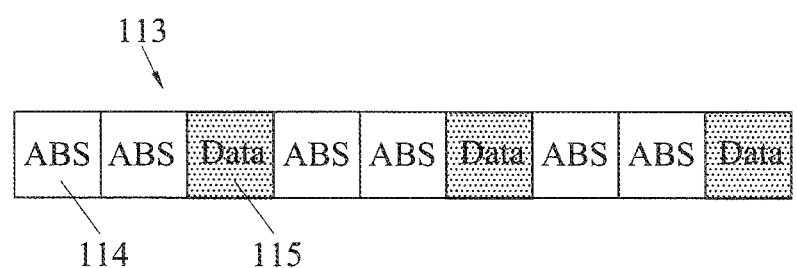
Figure 3C:
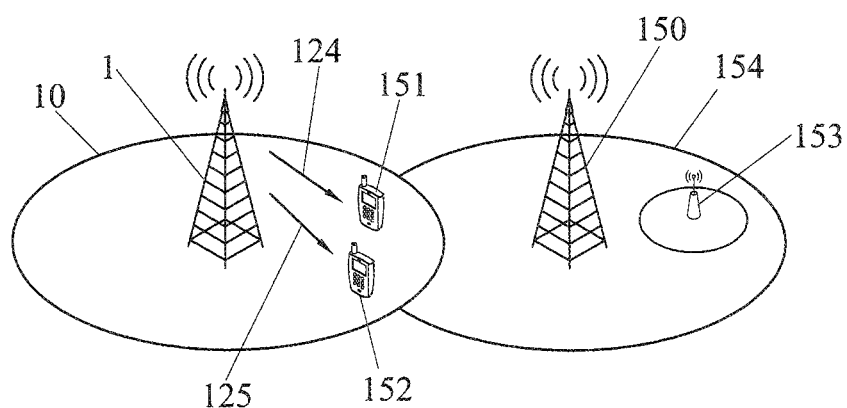
Figure 3D:
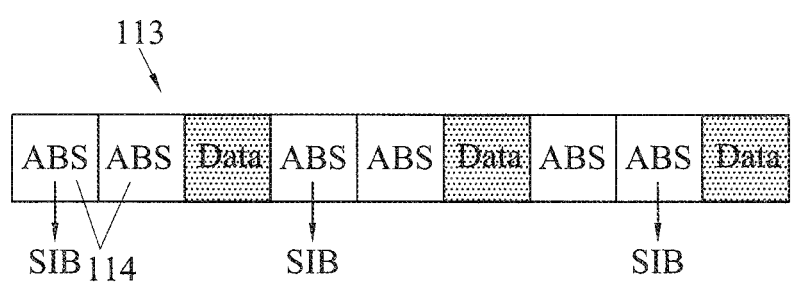

FIGS. 3A to 3F illustrate the method for reducing abnormal cell re-selection behaviors according to the present disclosure, wherein FIG. 3B illustrates the pattern information of the almost blank subframe, and FIG. 3D illustrates the transmission of the system information block according to the pattern information of the almost blank subframe.

As shown in FIGS. 3A and 3B, the pattern information detector 111 of the base station 1 (e.g., a service base station) provides pattern information 113 of an almost blank subframe to the base station 1 or the neighboring base station 150. In an embodiment, the pattern information 113 of the almost blank subframe includes almost blank subframe time 114 of an almost blank subframe ABS and data transmission time 115 for transmitting data. The first user equipment 151 and the second user equipment 152 are disposed in a region of a signal range 10 of the base station 1 intersecting with a signal range 154 of the neighboring base station 150, and a low-power base station 153 can be disposed within the signal range 154 of the neighboring base station 150.

Then, the base station 1 provides a first parameter threshold for cell-selection, and generates a second parameter threshold for cell-selection according to the pattern information 113 of the almost blank subframe.

As shown in FIGS. 3C and 3D, the base station 1 generates a broadcasting schedule according to the pattern information 113 of the almost blank subframe, and transmits the system information block 124 (e.g., SIB2-SIBn) having the first parameter threshold and the system information block 125 (e.g., SIB2-SIBn) having the second parameter threshold according to the broadcasting schedule. The first parameter threshold can be transmitted at any time, no matter whether the almost blank subframe exists or not. However, the second parameter threshold cannot be transmitted during the almost blank subframe time.

The first user equipment 151 and the second user equipment 152 can be turned-on to enter the idle mode, and are ready to receive the system information block 124 (e.g., SIB2-SIBn) having the first parameter threshold and the system information block 125 (e.g., SIB2-SIBn) having the second parameter threshold, respectively.

Figure 3E:
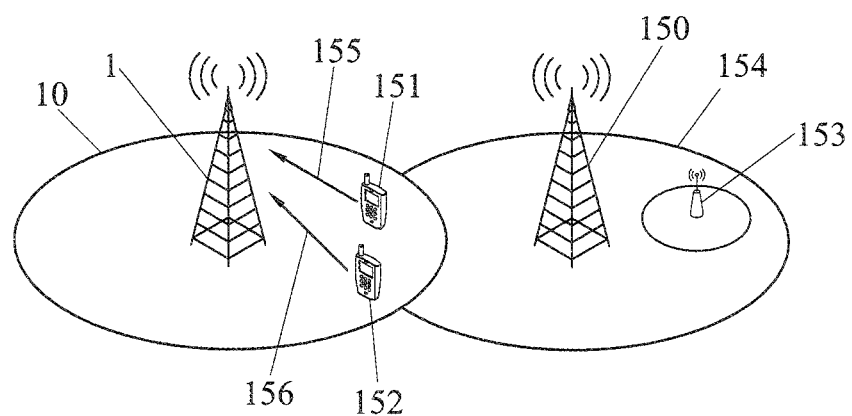

As shown in FIG. 3E, the first user equipment 151 and the second user equipment 152 can enter the connection mode, and report a version 155 of the first user equipment 151 and a version 156 of the second user equipment 152 to the base station 1, respectively. The base station 1 determines the version 155 of the first user equipment 151 to determine whether the first user equipment 151 has a long term evolution technique or does not have a processing function of the almost blank subframe. The base station 1 also determines the version 156 of the second user equipment 152 and determines whether the second user equipment 152 has an advanced long term evolution technique or a processing function of the almost blank subframe.

Figure 3F:
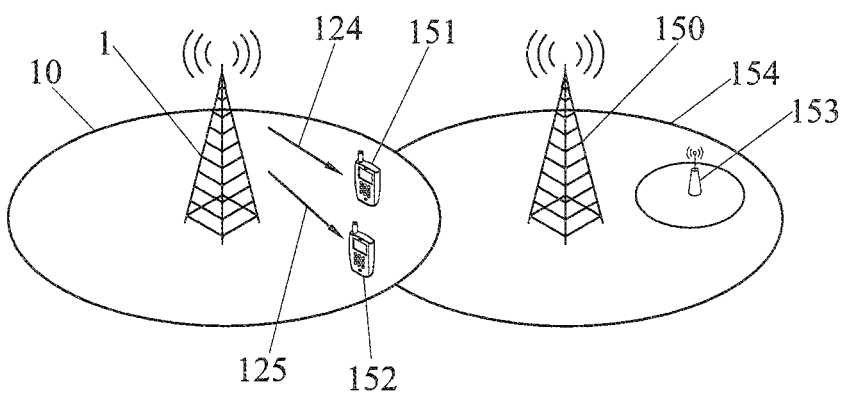

As shown in FIG. 3F, the base station 1 transmits the system information block 124 (e.g., SIB1) having the first schedule information to the first user equipment 151 in a broadcasting manner to allow the first user equipment 151 to receive the first parameter threshold from the base station 1 according to the first schedule information, and perform cell-selection to reduce abnormal cell re-selection behaviors according to the first parameter threshold and/or the RSRQ when being in the idle mode.

The base station 1 can also generate a dedicated signal according to a communication protocol (e.g., wireless resource control protocol), and transmit the system information block (e.g., SIB1) having the second schedule information to the second user equipment 152 through the dedicated signal to allow the second user equipment 152 to receive the second parameter threshold from the base station 1 according to the second schedule information, and perform cell-selection according to the second parameter threshold and/or the RSRQ when being in the idle mode.

It is thus known from the above that the base station and the method for reducing abnormal cell re-selection behaviors according to the present disclosure use the almost blank subframe (ABS) technique in the base station or its neighboring base station to control the first user equipment (e.g., LTE) and the second user equipment (e.g., LTE-A) to perform cell-selection according to the first parameter threshold and the second parameter threshold, respectively. Therefore, the first user equipment neither feels too optimistic for the RSRQ nor generates a great amount of abnormal cell-selection behaviors. Erroneous reselection decisions of the first user equipment made between the base station and the neighboring base station can be avoided accordingly.

It will be apparent to those skilled in the art that various modifications and variations can be made to the disclosed embodiments. It is intended that the specification and examples be considered as exemplary embodiments, with a true scope of the disclosure being indicated by the following claims and their equivalents.

What is claimed is:

1. A base station for reducing abnormal cell re-selection behaviors, comprising:
   a detector having a pattern information detector that provides pattern information of an almost blank subframe, and a measurement configuration adjustor that provides a first parameter threshold for cell-selection and generates a second parameter threshold for cell-selection according to the pattern information of the almost blank subframe; and
   a measurement configuration generator connected to the detector and having a measurement configuration schedule generator that generates a broadcasting schedule, a system information broadcaster that transmits a first schedule information to first user equipment according to the broadcasting schedule when the first user equipment establishes connection to allow the first user equipment to receive the first parameter threshold from the system information broadcaster according to the first schedule information and perform cell-selection according to the first parameter threshold, and a dedicated signal generator that generates a dedicated signal and transmits second schedule information to second user equipment when the second user equipment establishes connection to allow the second user equipment to receive the second parameter threshold from the system information broadcaster according to the second schedule information and perform cell-selection according to the second parameter threshold, wherein the pattern information of the almost blank subframe includes almost blank subframe time of the almost blank subframe and data transmission time for transmitting data, the first parameter threshold is transmitted at any time, no matter whether the almost blank subframe exists or not, and the second parameter threshold is not transmitted during the almost blank subframe time.

2. The base station of claim 1, wherein the system information broadcaster transmits a system information block having the first schedule information to the first user equipment according to the broadcasting schedule to allow the first user equipment to receive the system information block having the first parameter threshold according to the first schedule information and perform cell-selection according to the first parameter threshold when being in an idle mode.

3. The base station of claim 1, wherein the dedicated signal generator generates the dedicated signal according to a communication protocol and transmits a system information block having the second schedule information to the second user equipment, and the system information broadcaster transmits the system information block having the second parameter threshold according to the broadcasting schedule to allow the second user equipment to receive the system information block having the second parameter threshold according to the second schedule information and perform cell-selection according to the second parameter threshold when being in an idle mode.

4. The base station of claim 1, wherein the first user equipment, when being in an idle mode or a connection mode, receives a system information block having the first parameter threshold, and the second user equipment, when being in the idle mode or the connection mode, receives a system information block having the second parameter threshold.

5. The base station of claim 1, further comprising a broadcaster that uses a communication protocol and is connected to the system information broadcaster to receive a system information block having the first schedule information, a system information block having the first parameter threshold, and a system information block having the second parameter threshold, to transmit the system information block having the first schedule information and the system information block having the first parameter threshold to the first user equipment in a broadcasting manner, and to transmit the system information block having the second parameter threshold to the second user equipment in a broadcasting manner.

6. The base station of claim 1, further comprising a connector that uses a communication protocol and is connected to the dedicated signal generator to receive the dedicated signal and transmitting a system information block having the second schedule information to the second user equipment through the dedicated signal.

7. The base station of claim 1, wherein the measurement configuration schedule generator further determines a version of the first user equipment to determine whether the first user equipment has an almost blank subframe technique or does not have a processing function of the almost blank subframe, and determines a version of the second user equipment to determine whether the second user equipment has an advanced long term evolution technique or a processing function of the almost blank subframe.

8. A method for reducing abnormal cell re-selection behaviors, comprising:
- a base station providing pattern information of an almost blank subframe;
- the base station providing a first parameter threshold for cell-selection, and generating a second parameter threshold for cell-selection according to the pattern information of the almost blank subframe;
- the base station generating a broadcasting schedule according to the pattern information of the almost blank subframe; and
- the base station transmitting a first schedule information to first user equipment according to the broadcasting schedule when the first user equipment establishes connection to allow the first user equipment to receive the first parameter threshold from the base station according to the first schedule information and perform cell-selection according to the first parameter threshold, and a dedicated signal generator of the base station generating a dedicated signal and transmitting second schedule information to second user equipment when the second user equipment establishes connection to allow the second user equipment to receive the second parameter threshold from a system information broadcaster of the base station according to the second schedule information and perform cell-selection according to the second parameter threshold,
- wherein the pattern information of the almost blank subframe includes almost blank subframe time of the almost blank subframe and data transmission time for transmitting data, the first parameter threshold is transmitted at any time, no matter whether the almost blank subframe exists or not, and the second parameter threshold is not transmitted during the almost blank subframe time.

9. The method of claim 8, wherein the system information broadcaster transmits a system information block having the first schedule information to the first user equipment according to the broadcasting schedule to allow the first user equipment to receive the system information block having the first parameter threshold according to the first schedule information and perform cell-selection according to the first parameter threshold when being in an idle mode.

10. The method of claim 8, wherein the dedicated signal generator generates the dedicated signal according to a communication protocol and transmits a system information block having the second schedule information to the second user equipment, and the system information broadcaster transmits the system information block having the second parameter threshold according to the broadcasting schedule to allow the second user equipment to receive the system information block having the second parameter threshold according to the second schedule information and perform cell-selection according to the second parameter threshold when being in an idle mode.

11. The method of claim 8, wherein the first user equipment, when being in an idle mode or a connection mode, receives a system information block having the first parameter threshold, and the second user equipment, when in the idle mode or the connection mode, receives a system information block having the second parameter threshold.

12. The method of claim 8, wherein the base station has a broadcaster that receives a system information block having the first schedule information, a system information block having the first parameter threshold, and a system information block having the second parameter threshold, transmits the system information block having the first schedule information and the system information block having the first parameter threshold to the first user equipment in a broadcasting manner, and transmits the system information block having the second parameter threshold to the second user equipment in a broadcasting manner.

13. The method of claim 8, wherein the base station has a connector that receives the dedicated signal, and transmits the system information block having the second schedule information to the second user equipment through the dedicated signal.

14. The method of claim 8, further comprising determining a version of the first user equipment to determine whether the first user equipment has an almost blank subframe technique or does not have a processing function of the almost blank subframe, and determining a version of the second user equipment to determine whether the second user equipment has an advanced long term evolution technique or a processing function of the almost blank subframe.

* * * * *